US011879622B2

(12) United States Patent
Jiang et al.

(10) Patent No.: US 11,879,622 B2
(45) Date of Patent: Jan. 23, 2024

(54) DRIVER FOR DRIVING A LIGHT ENGINE OF A LUMINAIRE

(71) Applicant: LEDVANCE GmbH, Garching bei Munchen (DE)

(72) Inventors: Tianzheng Jiang, Shenzhen Guangdong (CN); Yonggang Xiao, Shenzhen Guangdong (CN)

(73) Assignee: LEDVANCE GMBH, Garching Bei Munchen (DE)

( * ) Notice: Subject to any disclaimer, the term of this patent is extended or adjusted under 35 U.S.C. 154(b) by 26 days.

(21) Appl. No.: 17/577,735

(22) Filed: Jan. 18, 2022

(65) Prior Publication Data

US 2022/0228733 A1 Jul. 21, 2022

(30) Foreign Application Priority Data

Jan. 20, 2021 (CN) ......................... 202110074716.6

(51) Int. Cl.

*F21V 23/00* (2015.01)
*F21V 23/06* (2006.01)
*H01R 13/453* (2006.01)
*H01R 13/627* (2006.01)

(52) U.S. Cl.

CPC ............ *F21V 23/008* (2013.01); *F21V 23/06* (2013.01); *H01R 13/4538* (2013.01); *H01R 13/6273* (2013.01)

(58) Field of Classification Search

CPC ........ F21V 23/008; F21V 23/06; F21V 17/14; F21V 17/162; F21V 23/007; F21Y 2115/10; H01R 13/4538; H01R 13/6273; H01R 45/30; H05B 45/30

See application file for complete search history.

(56) References Cited

U.S. PATENT DOCUMENTS

| | | | | |
|---|---|---|---|---|
| 11,175,003 | B2 * | 11/2021 | Jeswani .................. | F21K 9/237 |
| 2015/0092449 | A1 * | 4/2015 | Demuynck ........... | F21V 29/508<br>362/649 |
| 2017/0089557 | A1 * | 3/2017 | Ericson ..................... | F21S 8/04 |

* cited by examiner

*Primary Examiner* — Peggy A Neils
(74) *Attorney, Agent, or Firm* — Hayes Soloway PC

(57) ABSTRACT

A driver for driving a light engine of a luminaire is provided. The driver comprises a driver assembly with a driver circuit for converting an input current provided by a power supply into an output current for driving the light engine, a housing for receiving the driver assembly, and a driver interface being detachably engageable with a driver bracket. The driver interface comprises a mechanical interface for mechanically coupling the driver to a mechanical interface of the driver bracket and an electrical interface for electrically coupling the driver to an electrical interface of the driver bracket in such a way that the input current from the power supply to the driver circuit and the output current from the driver circuit to the light engine can flow via the driver interface. Further, a driver bracket and a luminaire are provided.

16 Claims, 18 Drawing Sheets

DRIVER FOR DRIVING A LIGHT ENGINE OF A LUMINAIRE

CROSS-REFERENCE TO RELATED APPLICATIONS

This patent application claims priority from Chinese Patent Application No. 202110074716.6, filed Jan. 20, 2021, which is hereby incorporated by reference in its entirety.

TECHNICAL FIELD

The technical field of the present application generally relates to electric drivers. In particular, the present disclosure relates to drivers for driving light engines of a luminaire.

BACKGROUND

Drivers for driving light engines, in particular, light engines of luminaires are known. Further, LED drivers for converting AC mains current to a DC current for powering LED light engines are known as well. Generally, the drivers are mechanically and electrically connected to the luminaires for driving the light engines. Once mounted in a luminaire, the drivers are not easily exchangeable. Releasing the mechanical and electrical connections of the driver for replacing the driver by another driver may be cumbersome and unsafe.

SUMMARY

The object of the present application is to provide a driver for driving a light engine which can be easily and safely mounted and replaced if necessary.

According to a first aspect, a driver for driving a light engine of a luminaire is provided. The luminaire, in terms of the present disclosure, may be a light fixture, a lamp, or lighting apparatus comprising a light engine with a light source for generating light. In particular, the light source may be an LED light source, and the light engine may be an LED driver configured for driving the LED light source.

The driver comprises a driver assembly with a driver circuit for converting an input current provided by a power supply, in particular, an AC current from the mains, into an output current, in particular, a DC current, for driving the light engine. The driver further comprises a housing for receiving the driver assembly and a driver interface. The driver interface is configured to be detachably engageable with a driver bracket and comprises a mechanical interface for mechanically coupling the driver to a mechanical interface of the driver bracket and an electrical interface for electrically coupling the driver to an electrical interface of the driver bracket in such a way that the input current from the power supply to the driver circuit and the output current from the driver circuit to the light engine can flow via the driver interface.

The driver bracket may be, in particular, mounted on the luminaire and configured for receiving the driver such that the electrical interface of the bracket is coupled with the electrical interface of the driver and the mechanical interface of the bracket is coupled with the mechanical interface of the driver.

Both the mechanical and the electrical interface of the driver are configured as a single interface. Therefore, such a driver can be easily mounted and/or replaced. Furthermore, during the replacement process, no separate steps for taking off the wires from the driver or luminaire and screwing or unscrewing are needed. Hence, the novel driver structure is easily mountable, and the luminaire, in particular, an LED luminaire, with such a driver is characterized by easy maintenance.

The driver interface may be configured such that the coupling of the mechanical interface of the driver to the mechanical interface of the driver bracket automatically couples the electrical interface of the driver to the electrical interface of the driver bracket and a de-coupling or releasing of the mechanical interface of the driver from the mechanical interface of the driver bracket automatically de-couples or releases the electrical interface of the driver from the electrical interface of the driver bracket.

Thus, the electrical and mechanical coupling of the driver with the driver bracket can be done in one single step, making the mounting and/or dismounting process of the driver particularly simple.

The mechanical interface of the driver may be configured such that the mechanical coupling, in particular, the mechanical coupling of the mechanical interface of the driver with the mechanical interface of the driver bracket, is established by pressing or pushing the driver and the driver bracket against each other. The driver can be easily mounted on the luminaire just by pressing the driver against the driver bracket mounted on the luminaire, without using any special instruments.

The mechanical interface of the driver may be configured such that the mechanical decoupling, in particular, the mechanical decoupling of the mechanical interface of the driver from the mechanical interface of the driver bracket, is achieved by pressing, in particular, by pressing again, the driver and the driver bracket against each other. Thus, the mounting and dismounting of the driver can be achieved with a simple translational movement of pushing the driver and the driver bracket against each other.

The electrical interface may comprise an AC input area with at least one AC input contact and a DC output area with at least one DC output contact. In particular, the AC input area may comprise two AC input contacts, and the DC output area may comprise at least two DC output contacts. By providing separate areas for the AC input and the DC output, the risk of a short circuit or malfunction of the electrical interface can be reduced.

At least one of the AC input contact and the DC output contacts may comprise at least one spring plate contact. The spring plate contact, due to its resiliency, may provide a reliable electrical contact with an electrical contact of the driver bracket pressed on it.

The mechanical interface of the driver may be configured as a plug, which is insertable in a mechanical interface of a driver bracket configured as a socket. Mounting of such a driver on a luminaire equipped with such a driver bracket is particularly intuitive and simple, since the installer just needs to plug the driver into the bracket.

The electrical interface of the driver interface may be formed at a front portion of the plug. By providing the electrical interface at the front portion of the plug, the electrical interface can be protected from direct access from outside and cannot be touched accidentally by installers or users.

The driver interface may further comprise a pole for pushing away a protective cover of the bracket. In particular, the protective cover of the bracket may comprise a slant surface and may be configured as a slidable cover with a spring. If the driver interface is not coupled with the bracket interface, the spring keeps the cover in its initial position such that the AC input plate is shielded when no driver is coupled with the driver bracket. During the coupling of the driver interface and the driver bracket interface, the pole of the driver interface presses the slant surface of the cover such that the protective cover slides away towards the spring and the electrical contact between the driver interface and the bracket interface can be established in a safe and reliable way.

According to a second aspect, a driver bracket for coupling with a driver according to the first aspect for driving a light engine of a luminaire is provided. The driver bracket comprises a circuit assembly with one or more input contacts electrically connectable to a power supply, in particular, to the mains, and one or more output contacts electrically connectable to the light engine. The driver bracket further comprises a housing for receiving the circuit assembly and a driver bracket interface, the driver bracket interface being detachably engageable with the driver interface. The driver bracket interface is configured such that the input current from the power supply to the driver assembly and the output current from the driver assembly to the light engine can flow via the driver bracket interface. The driver can be easily installed by coupling the driver interface to the driver bracket interface, since the driver bracket interface provides a single interface for both input current and the output current of the driver.

The driver bracket interface may comprise a slidably mounted protective cover with a spring for keeping the interface contacts covered by the protective cover when the driver bracket is not coupled with the driver. In particular, the protective cover of the bracket may comprise a slant surface and may be configured such that, in the course of coupling of the driver interface and the driver bracket interfaces, the pole of the driver interface presses the slant surface of the cover such that the protective cover slides away, in particular, towards the spring, and the electrical contacts of the bracket interface become accessible by the electrical contacts of the driver interface. Thus, a safe electrical connection between the driver and the bracket can be established.

The driver bracket interface may comprise one or more door release snaps for receiving snapping pins of the driver interface. In particular, the door release snaps may be configured for receiving and locking the snapping pins of the driver interface for securing the coupling between the driver and the driver bracket.

The housing of the driver bracket may comprise mounting elements for mounting the driver bracket on the luminaire, in particular, on a surface of the luminaire. The mounting elements may comprise snaps and/or screw holes for mounting the driver bracket on a flat surface of the luminaire.

According to a third aspect, a luminaire with a light engine and a driver bracket according to the second aspect is provided. A driver according to the first aspect can be easily mounted by coupling the driver with the driver bracket, as described above.

The luminaire may comprise the driver according to the first aspect, coupled with the driver bracket of the luminaire. The driver can be easily removed or replaced (e.g., by a next-generation driver) with better and/or additional functionalities for upgrading the luminaire.

BRIEF DESCRIPTION OF THE DRAWINGS

In the following description, details are provided to describe the embodiments of the present specification. It shall be apparent to one skilled in the art, however, that the embodiments may be practiced without such details.

Some parts of the embodiments have similar parts. The similar parts may have same names or similar part numbers. The description of one part applies by reference to another similar part, where appropriate, thereby reducing repetition of text without limiting the disclosure.

DETAILED DESCRIPTION

Figure 1:
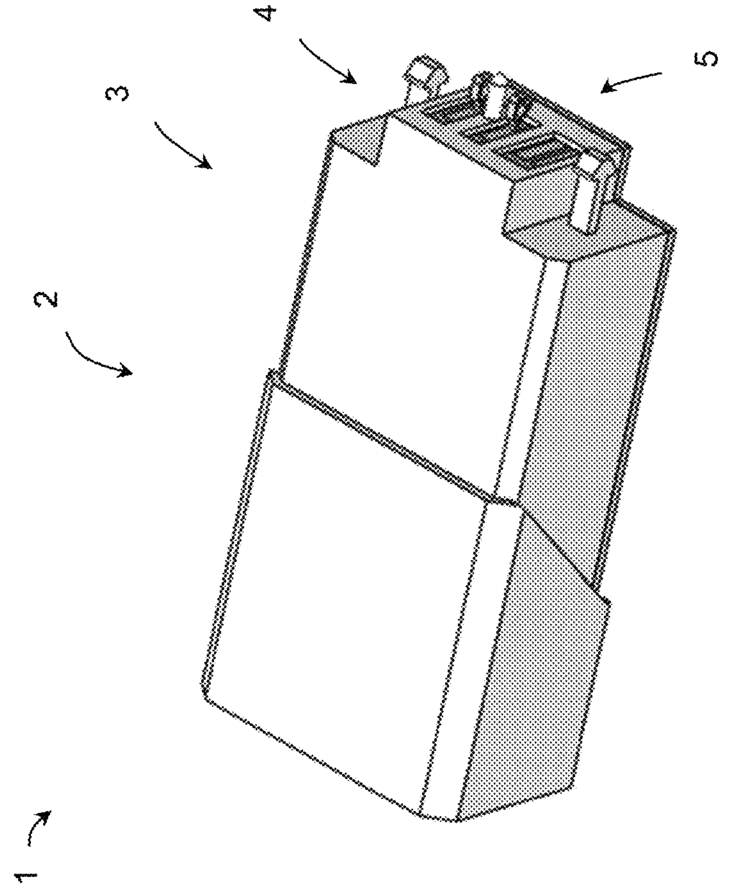
FIG. 1 shows a perspective view of a driver according to an embodiment.

FIG. 1 shows a perspective view of a driver 1 according to an embodiment. The driver 1 comprises a housing 2 and a driver interface 3 for coupling the driver 1 with a driver bracket 20. The driver interface 3 comprises a mechanical interface 4 and an electrical interface 5. The driver 1 further comprises a driver assembly (not shown) with a driver circuit (not shown) for converting an input current provided by a power supply (e.g., the mains) into an output current for driving a light engine of a luminaire. The driver 1 may be configured, in particular, as an LED-driver for driving an LED light engine of an LED luminaire. The mechanical interface 4 and the electrical interface 5 will be discussed below in connection with further Figures in more detail.

Figure 2:
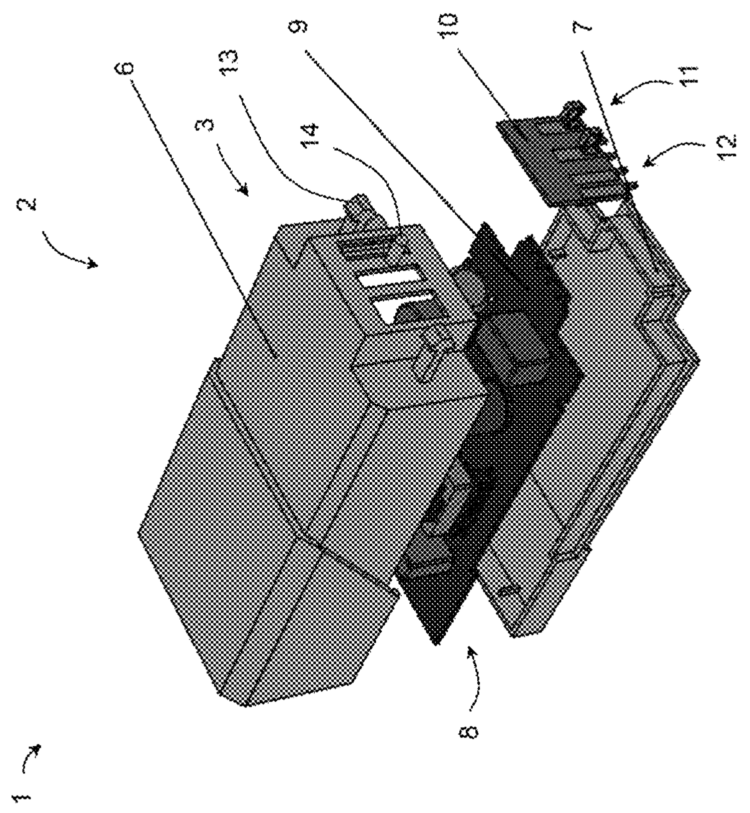
FIG. 2 shows an exploded view of the driver according to FIG. 1.

FIG. 2 shows an exploded view of the driver 1 according to FIG. 1. The housing 2 comprises a top housing 6 and a bottom cover 7, with the driver assembly 8 arranged on a driver printed circuit board (PCB) 9 arranged in the housing 2. The electrical interface 5 comprises a transfer PCB 10 with an AC input area 11 and a DC output area 12. The mechanical interface 4 comprises snapping pins 13 for engaging with door release snaps of the driver bracket 20 and a pole 14 for pushing away a protective cover of the driver bracket 20.

Figure 3:
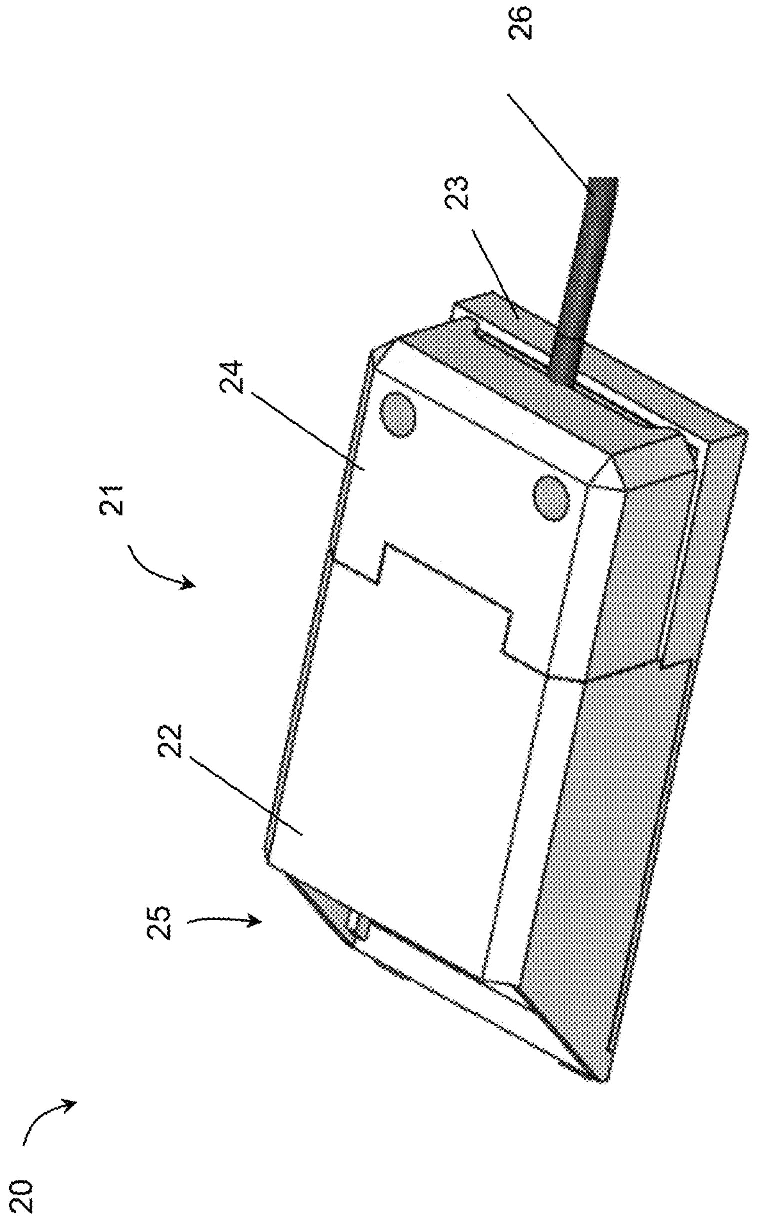
FIG. 3 shows a perspective view of a driver bracket according to an embodiment.

FIG. 3 shows a perspective view of a driver bracket 20 according to an embodiment. The driver bracket 20 comprises a housing 21 with a top housing 22, a bottom cover 23, and a top cover 24.

The driver bracket 20 further comprises a circuitry with input contacts which are electrically connectable to a power supply and output which is electrically connectable to a light engine of a luminaire. The circuitry and the contacts are not shown in FIG. 3. The driver bracket 20 further comprises a driver bracket interface 25 with a mechanical interface (not shown) for mechanically coupling the driver bracket 20 with a driver 1 and an electrical interface (not shown) for electrically coupling the driver bracket 20 with the driver 1. The driver 1 may be configured in accordance with the embodiment of FIG. 1. FIG. 3 also shows an AC cable 26 for connecting the driver bracket 20 to the mains.

Figure 4:
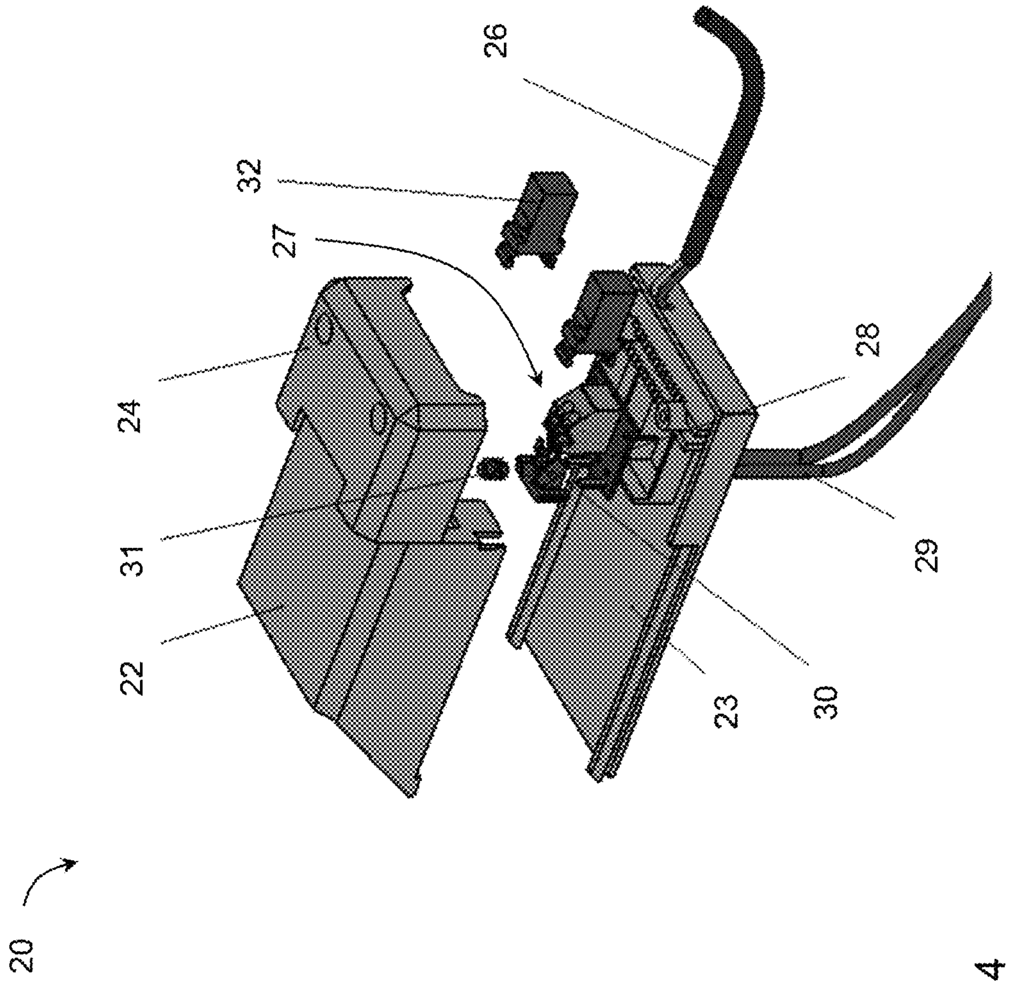
FIG. 4 shows an exploded view of the driver bracket according to FIG. 2.

FIG. 4 shows an exploded view of the driver bracket 20 according to FIG. 3. The driver bracket 20 comprises a circuit assembly 27 of the driver bracket 20 with a wire connect PCB 28 electrically connected to the AC cable 26 and DC output wires 29. FIG. 4 also shows a protective cover 30 and a spring 31 of the protective cover 30 for keeping the protective cover 30 in its initial "closed" position. The exploded view of FIG. 4 shows further door release snaps 32 for engaging with the snapping pins 13 of the driver 1.

Figure 5:
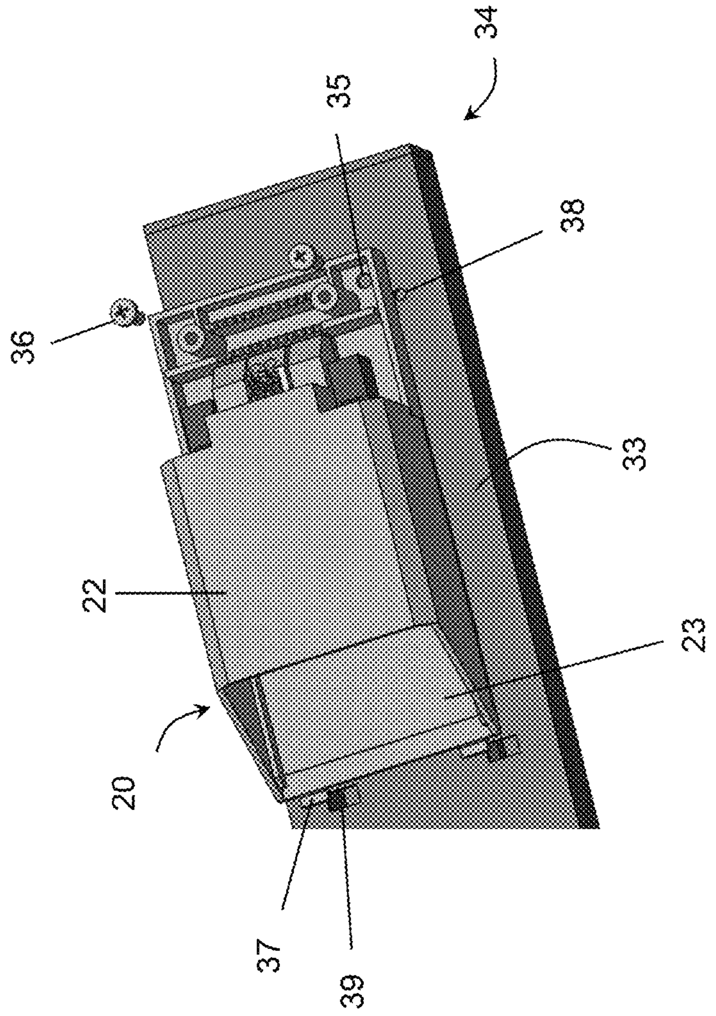
FIG. 5 illustrates a stage of mounting of the driver bracket of FIG. 3.

FIG. 5 illustrates a stage of mounting of the driver bracket 20 of FIG. 3 on a luminaire. In particular, FIG. 5 shows the driver bracket 20 of FIG. 3 without the top cover 24 in the process of mounting of the driver bracket 20 on a flat mounting surface 33 of a luminaire 34. The driver bracket 20 mounting elements comprising screw holes 35 for receiving screws 36 and snaps 37 are provided at the bottom cover 23 of the driver bracket 20. The mounting surface 33 of the luminaire 34 can be provided with screw holes 38 and snap holes 39 for mounting the driver bracket 20. In order to mount the driver bracket 20, the snaps 37 of the driver bracket 20 can be inserted in the corresponding snap holes 39 of the luminaire, and the bottom cover 23 of the driver bracket 20 can be fixed by inserting the screws 36 in the screw holes 35 of the bottom cover 23 and screwing the screws 36 into the screw holes 38 of the luminaire. The driver bracket 20 can thus be easily and reliably mounted to any flat surface of a luminaire.

Figure 6:
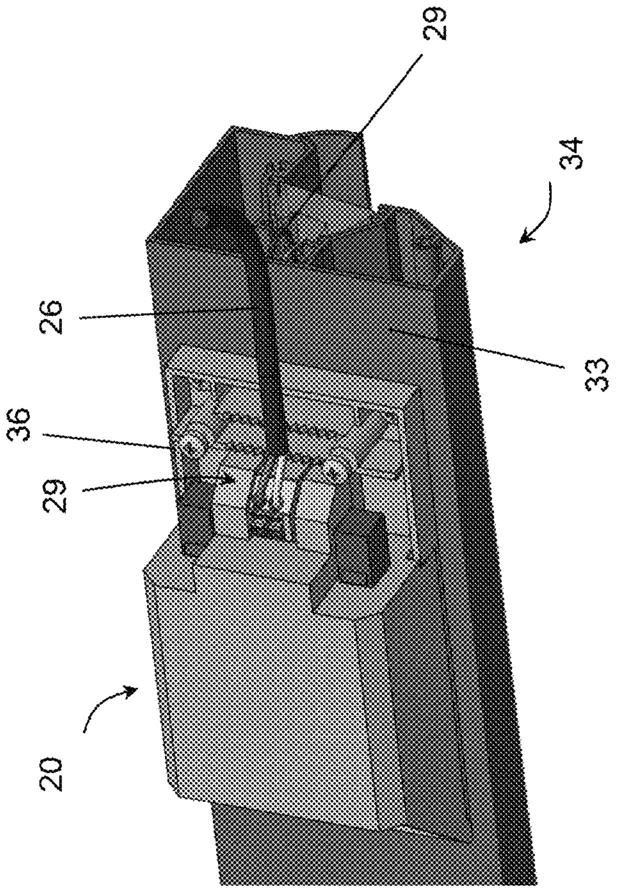
FIG. 6 illustrates another stage of mounting of the driver bracket of FIG. 3.

FIG. 6 illustrates another stage of mounting the driver bracket 20 of FIG. 3. At the mounting stage shown in FIG. 6, the bottom cover 23 of the driver bracket 20 is already fixed to the mounting surface 33 of the luminaire 34 and fixed with the screws 36. The AC cable 26 is connected to a connector 40, and the DC output wires 29 are threaded through a hole (not shown) in the bottom cover 23 of the driver bracket 20 and a hole (not shown) in the mounting surface 33 of the luminaire 34 and connected to the light engine (not shown) of the luminaire 34.

Figure 7:
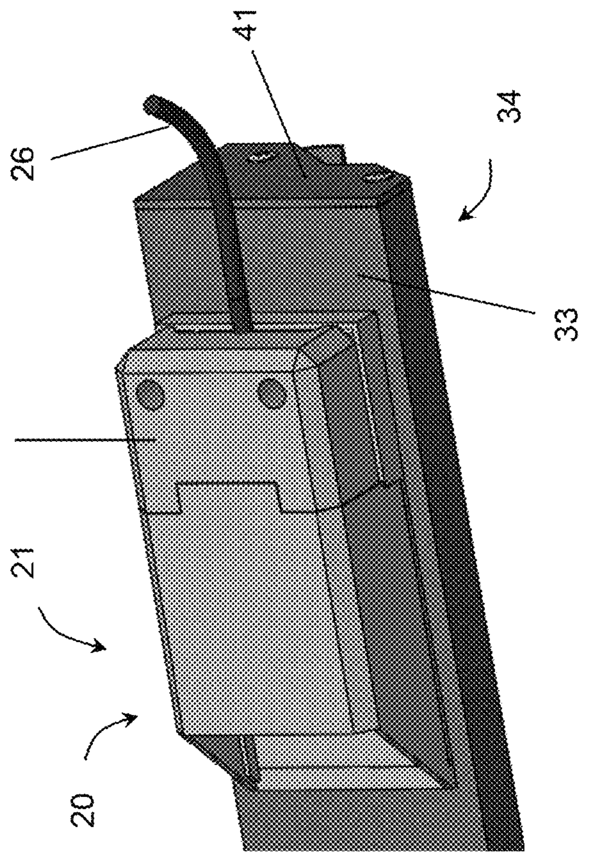
FIG. 7 illustrates a final stage of mounting of the driver bracket of FIG. 3.

FIG. 7 illustrates a final stage of mounting the driver bracket 20 of FIG. 3. At this stage, the top cover 24 of the housing 21, as well as a luminaire cover 41 which has been removed before in order to connect the DC output wires 28 to the light engine, has been fixed. Thus, after mounting of the driver bracket 20, all electrical contacts are covered and protected from any unintentional contact.

Figure 8:
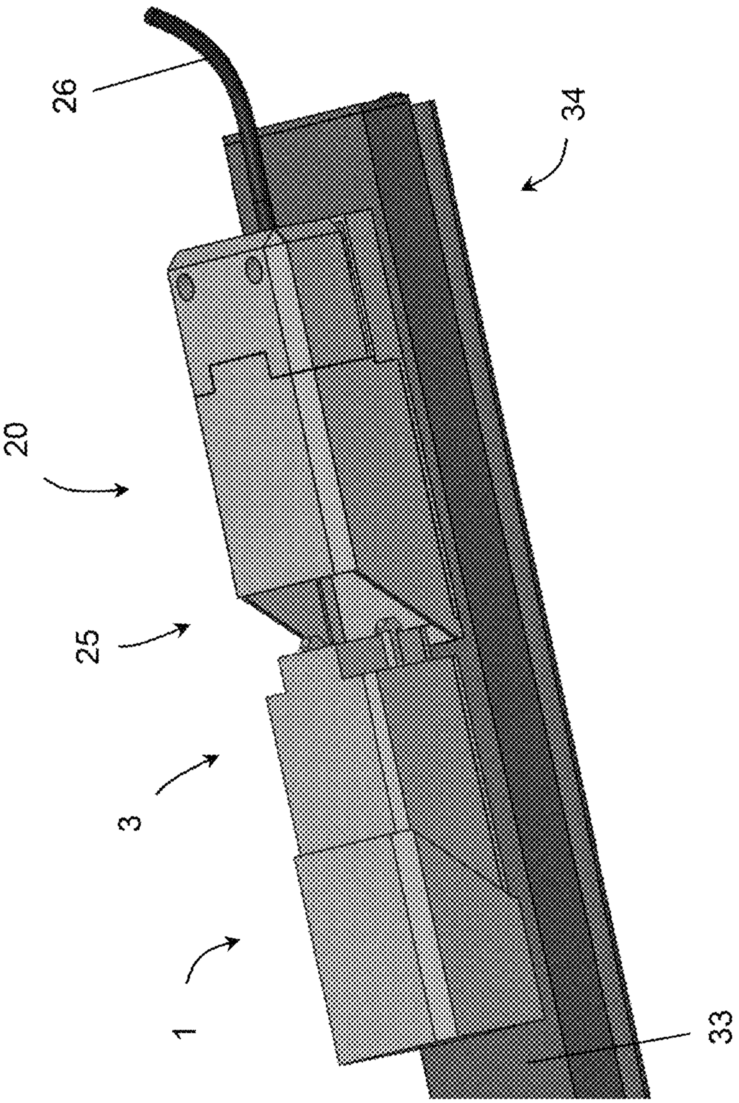
FIG. 8 illustrates a process of coupling of the driver of FIG. 1 with the driver bracket of FIG. 3.

FIG. 8 illustrates a process of coupling of the driver 1 of FIG. 1 with the driver bracket 20 of FIG. 3. The driver bracket 20 has been mounted on the mounting surface 33 of the luminaire 34 as described in FIGS. 5-6 above. The driver 1 is positioned such that the driver interface 3 of the driver 1 faces the interface 25 of the driver bracket 20. The coupling of the driver 1 and the driver bracket 20 is effectuated by a translational movement of the driver 10 relative to the driver bracket 20 such that the driver interface 3, which is configured as a plug, engages with the interface 25 of the driver bracket 20, which is configured as a socket.

Figure 9:
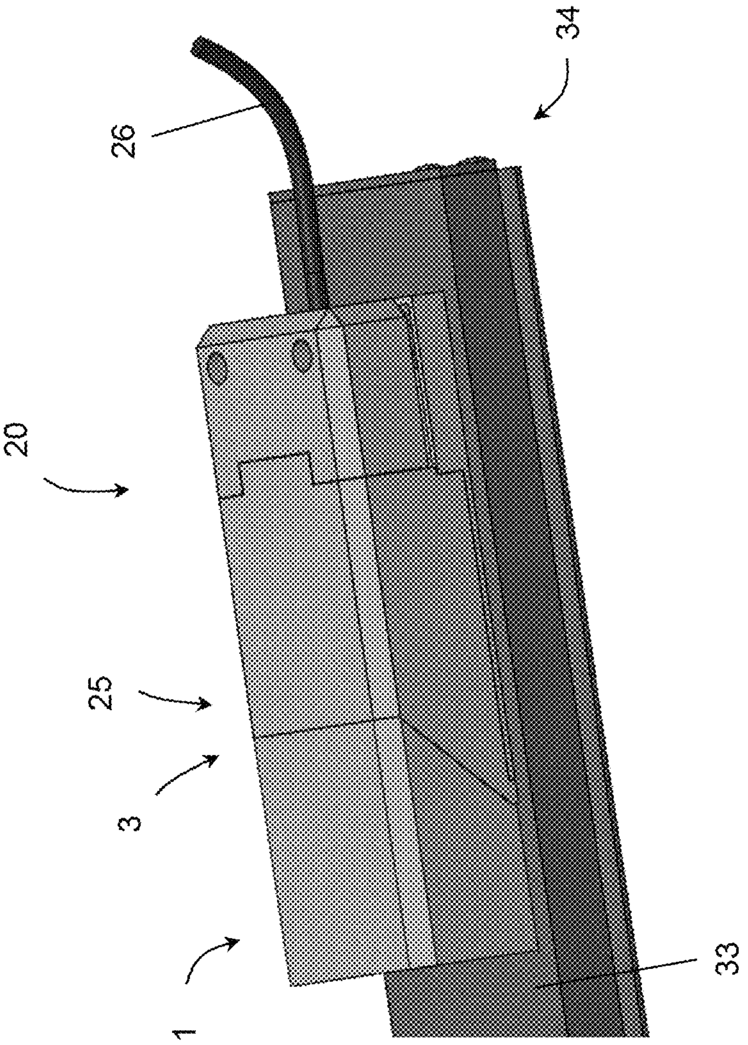
FIG. 9 shows the driver of FIG. 1 and the driver bracket of FIG. 3 in the coupled state.

FIG. 9 shows the driver 1 of FIG. 1 and the driver bracket 20 of FIG. 3 in the coupled state. In particular, the coupled state of the driver 1 and the driver bracket 20 corresponds to the situation when the process of coupling of the driver 1 and the driver bracket 20 mounted on the mounting surface 33 of the luminaire 34, according to FIG. 8, has been accomplished. The driver 1 and the driver bracket 20 are connected to a single driver-bracket system in a simple way, just plugging the driver 1 into the driver bracket 20.

Figure 10:
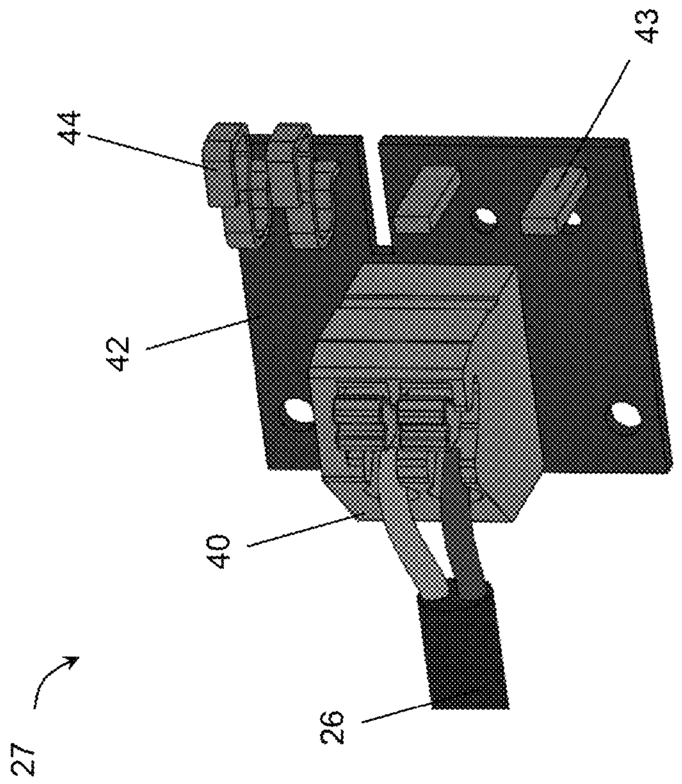
FIG. 10 shows a circuit assembly of a driver bracket according to an embodiment, FIG. 11 show as a perspective view of the front portion of the driver of FIG. 1.

FIG. 10 shows a circuit assembly of a driver bracket 20 according to an embodiment. In particular, FIG. 10 shows the circuit assembly 27 of the driver bracket 20 of FIG. 3 in more detail. The circuit assembly 27 comprises a driver bracket circuitry with a wire connect PCB 42. The connector 40 is mounted on the wire connect PCB 42. The circuit assembly 27 further comprises plate contacts 43 and plate spring contacts 44 mounted on the wire connect PCB 42. FIG. 10 also shows the AC cable 26 connected with the connector 40.

Figure 11:
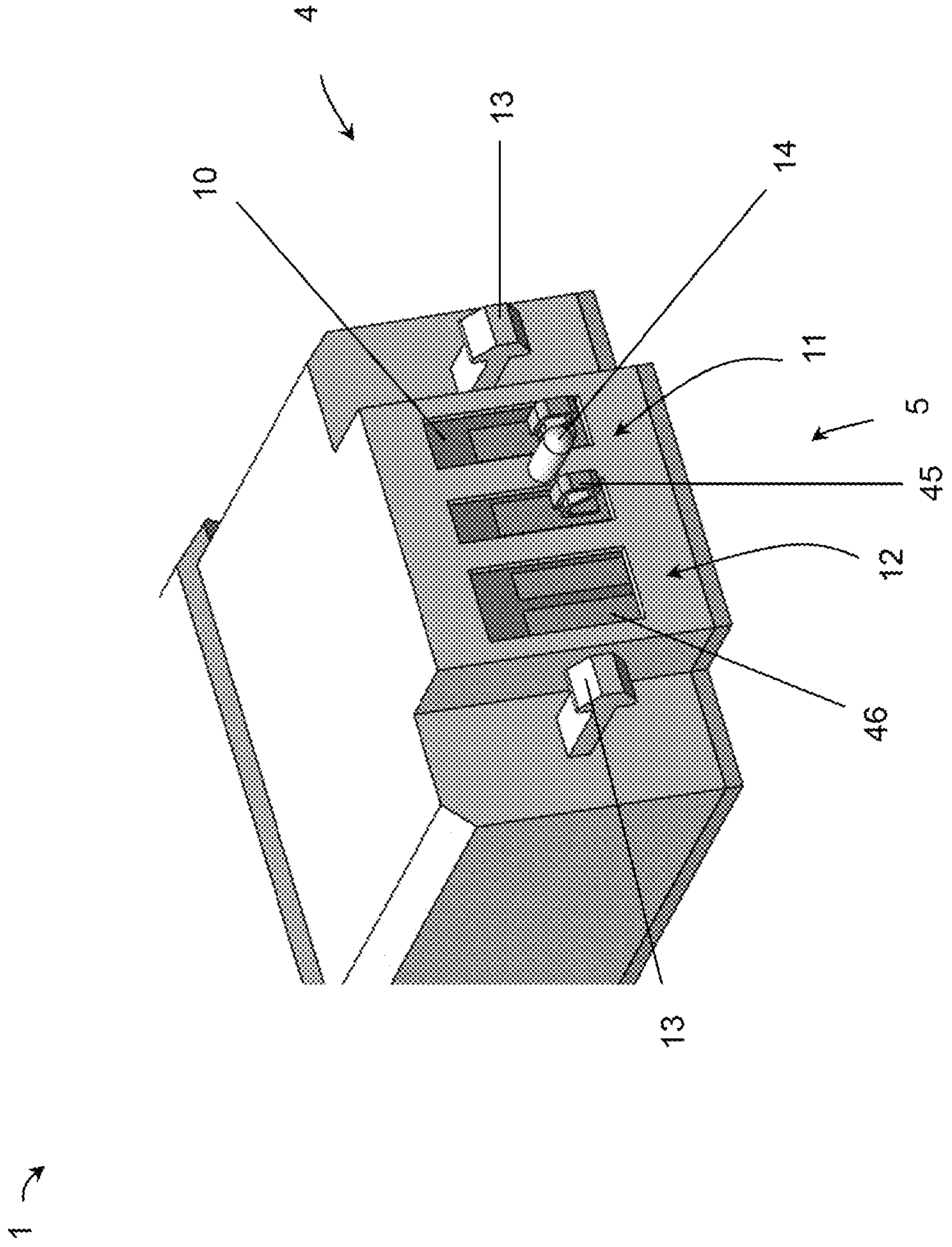

FIG. 11 shows a perspective view of the front portion of the driver 1 of FIG. 1. In particular, FIG. 11 shows the mechanical interface 4 and the electrical interface 5 of the driver 1 in more detail. The mechanical interface 4 comprises two snapping pins 13 for engaging with door release snaps 32 of the driver bracket 20 (see FIG. 4 above). The electrical interface 5 with the transfer PCB 10 comprises two plate spring contacts 45 in the AC input area 11 for electrically contacting the plate contacts 43 of the driver bracket 20 and two plate contacts 46 in the DC output area 12 for electrically contacting the plate spring contacts 44 of the driver bracket 20. The pole 14 is provided in the AC input area 11 between the two plate spring contacts 45. The pole has an essentially cylindrical shape and a smooth rounded tip protruding beyond the plate spring contacts 45. Due to the smooth tip of the pole 14, by pressing the tip on a slant surface of the protective cover 30, the protective cover 30 can be easily pushed away, and the electrical connection between the driver 1 and the driver bracket 20 can be established.

Figure 12:
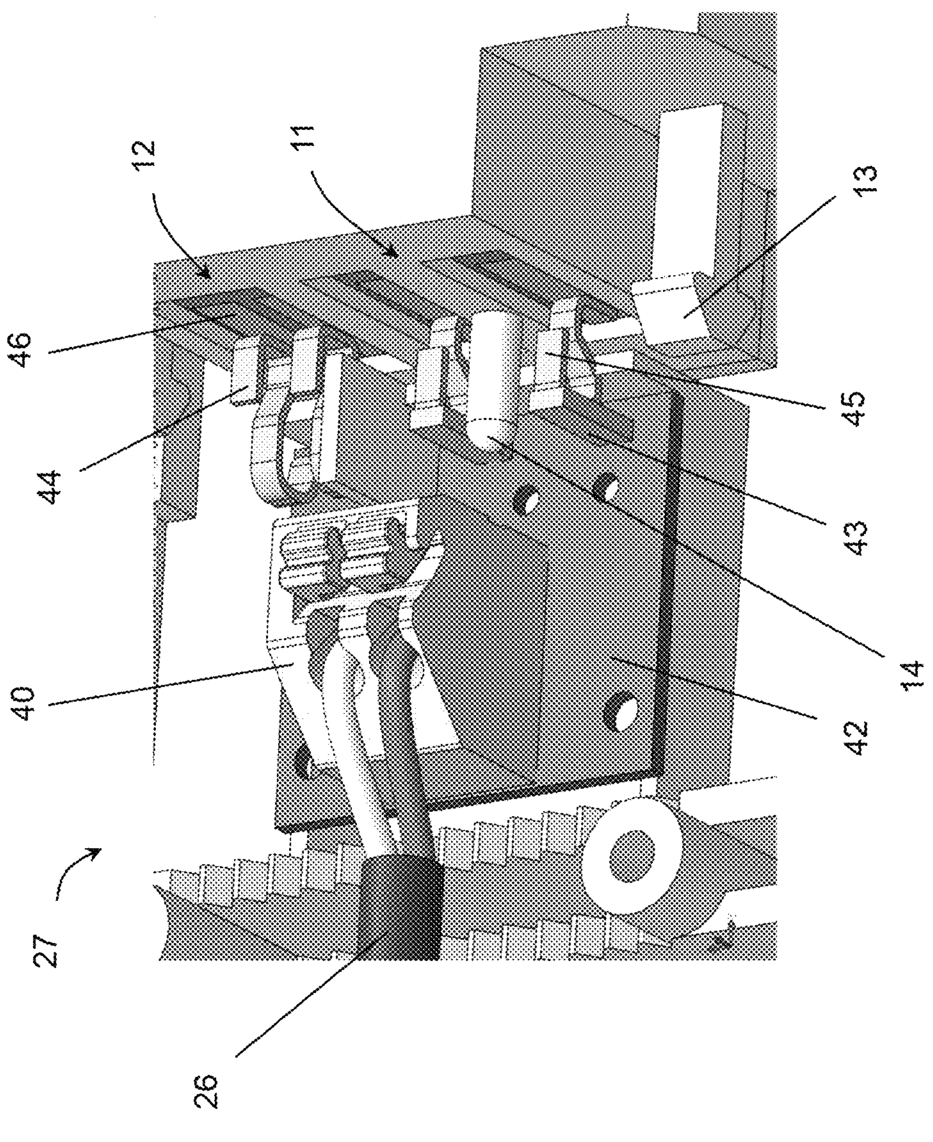
FIG. 12 shows the circuit assembly of FIG. 10 in a mounted state.

FIG. 12 shows the circuit assembly of FIG. 10 in a mounted state. In particular, FIG. 12 shows a detailed view of the circuit assembly 27 of the driver bracket 20, in the case when the driver 1 is coupled to the driver bracket 20. The plate contacts 43 of the driver bracket 20 are in contact with the plate spring contacts 45 in the AC input area 11 of the driver 1, and the plate spring contacts 44 of the driver bracket 20 are in contact with the plate contacts 46 in the DC output area 12 of the driver 1.

Figure 13:
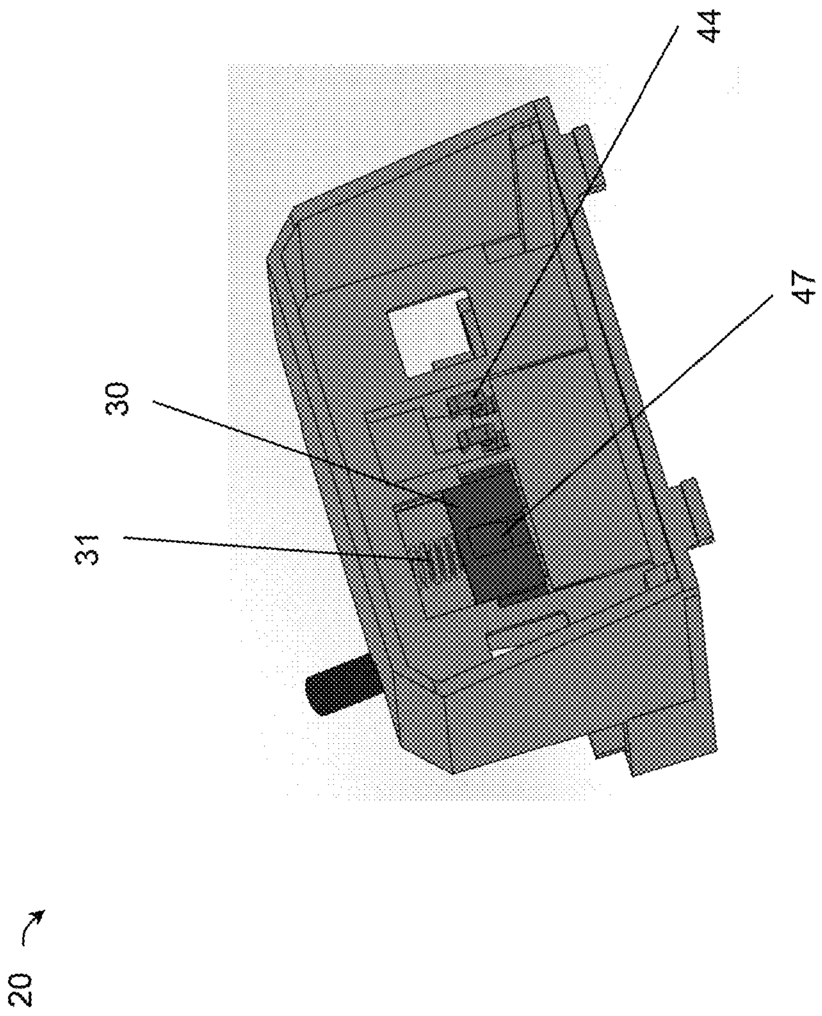
FIG. 13 shows a perspective view of driver bracket of FIG. 3 from a different perspective.

FIG. 13 shows a perspective view of driver bracket 20 of FIG. 3 from a different perspective. In particular, FIG. 13 shows a detailed view of the driver bracket interface 25 in the case when the driver bracket 20 is not engaged with a driver 1. From the shown perspective, the plate spring contacts 44 of the driver bracket 20 can be clearly seen. The plate contacts 43 of the driver bracket 20 are, however, covered by the slidable mounted protective cover 30, which is held in the "closed" position by the spring 31. The protective cover 30 has a slant surface 47 which is configured such that the protective cover 30 can be pushed away against the compression force of the spring by the pole 14 of the driver 1 when the tip of the pole 14 is pressed on the slant surface 47 of the protective cover 30. After removing the driver 1 from the driver bracket 20, the spring 31 forces the protective cover 30 to its initial "closed" position.

Figure 14:
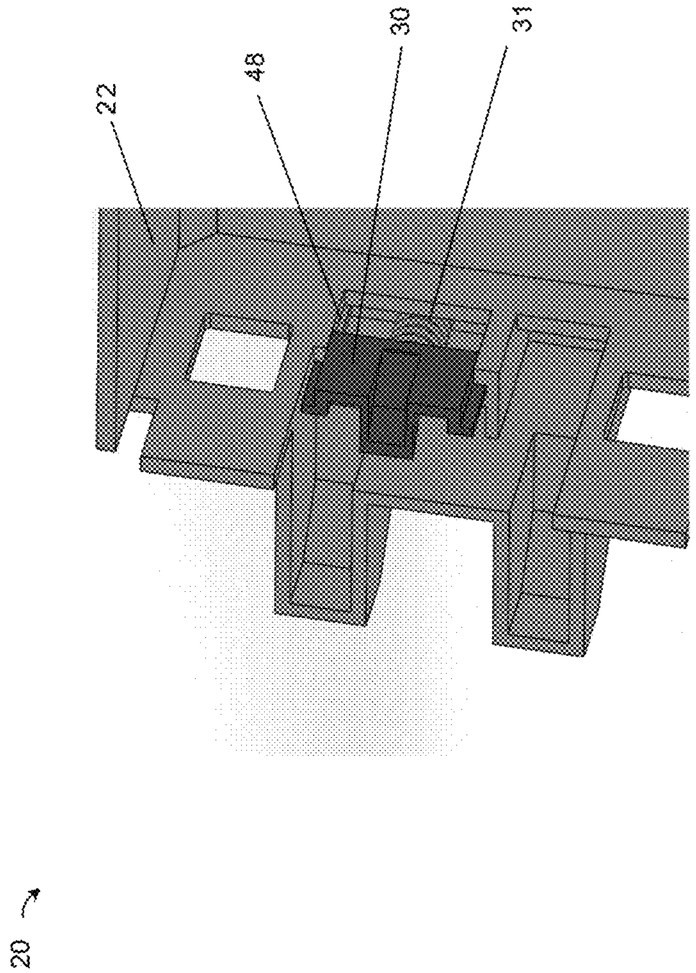
FIG. 14 shows a detailed view of the driver bracket of FIG. 3.

FIG. 14 shows a detailed view of the driver bracket 20 of FIG. 3. In particular, FIG. 14 shows the sliding mechanism of the protective cover 30 in more detail. The protective cover 30 is mounted in a sliding guide 48 formed in the top housing 22 of the driver bracket 20. The guide 48 is configured such that there is room for mounting the spring 31.

Figure 15:
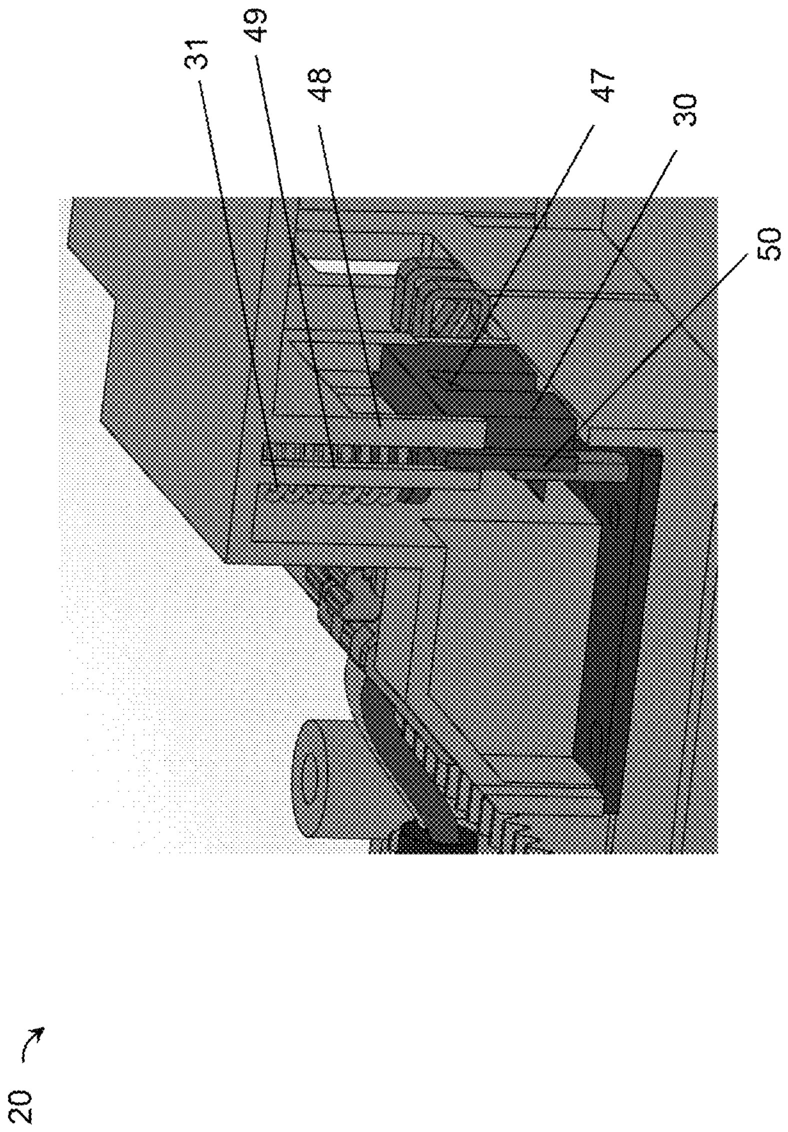
FIG. 15 shows a cutaway view of the driver bracket of FIG. 3.

FIG. 15 shows a cutaway view of the driver bracket 20 of FIG. 3. In the cutaway view of FIG. 15, further details of the sliding mechanism of the protective cover 30 can be seen. The guide 48 comprises guiding slots 49 for receiving guiding rails 50 of the protective cover 30 such that the protective cover 30 can slide along the guiding slots 49 of the guide 48.

Figure 16:
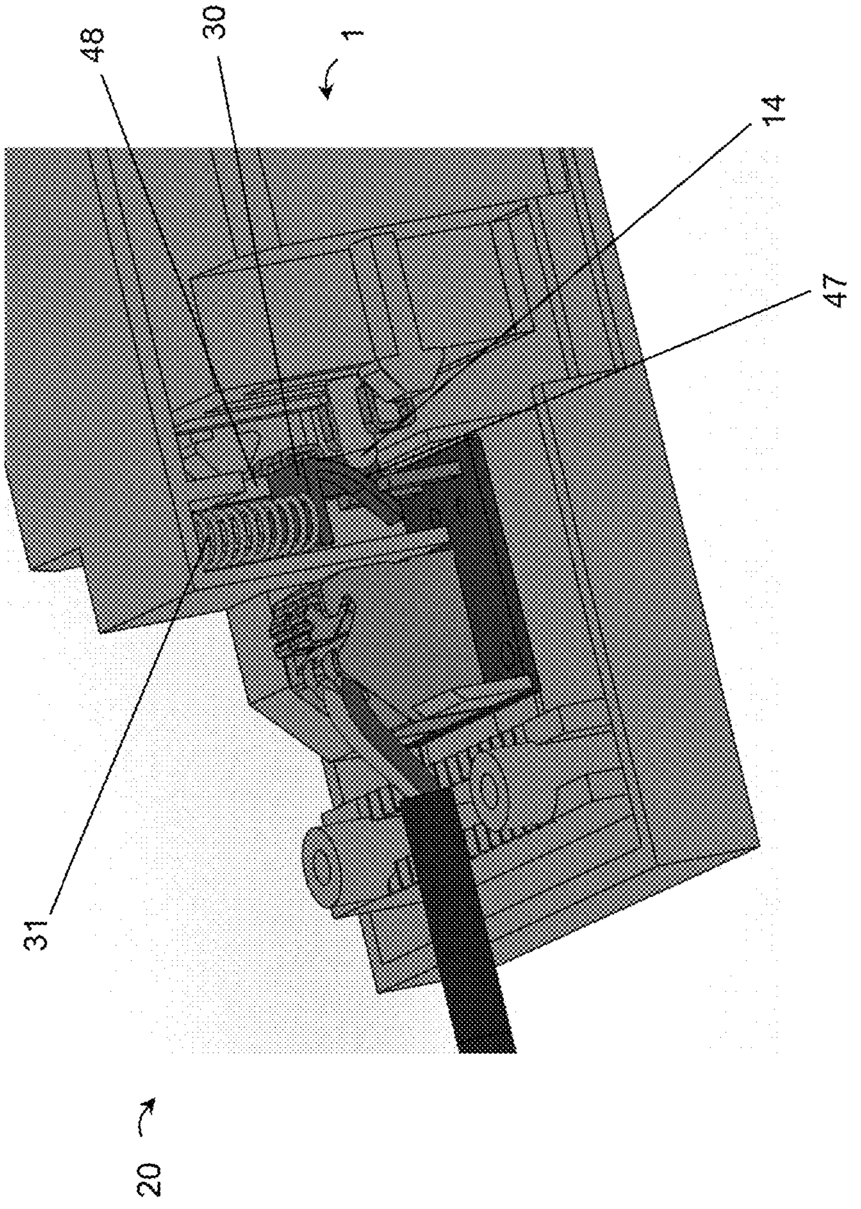
FIG. 16 shows a cutaway view of the coupling region of the driver and the driver bracket.

FIG. 16 shows a cutaway view of the coupling region of the driver 1 and the driver bracket 20. In particular, FIG. 16 shows the coupling region of the driver bracket 20 and the driver 1 at a coupling stage when the driver is already inserted in the driver bracket 20 but the electrical contact between the driver 1 and the driver bracket 20 is not established yet. At the coupling stage of FIG. 16, the tip of the pole 14 is touching slant surface 47 of the protective cover 30, pushing the protective cover 30 against the spring 31. The spring 31 is getting compressed, and the protective cover 30 begins to slide along the guiding slots 49 of the guide 48.

Figure 17:
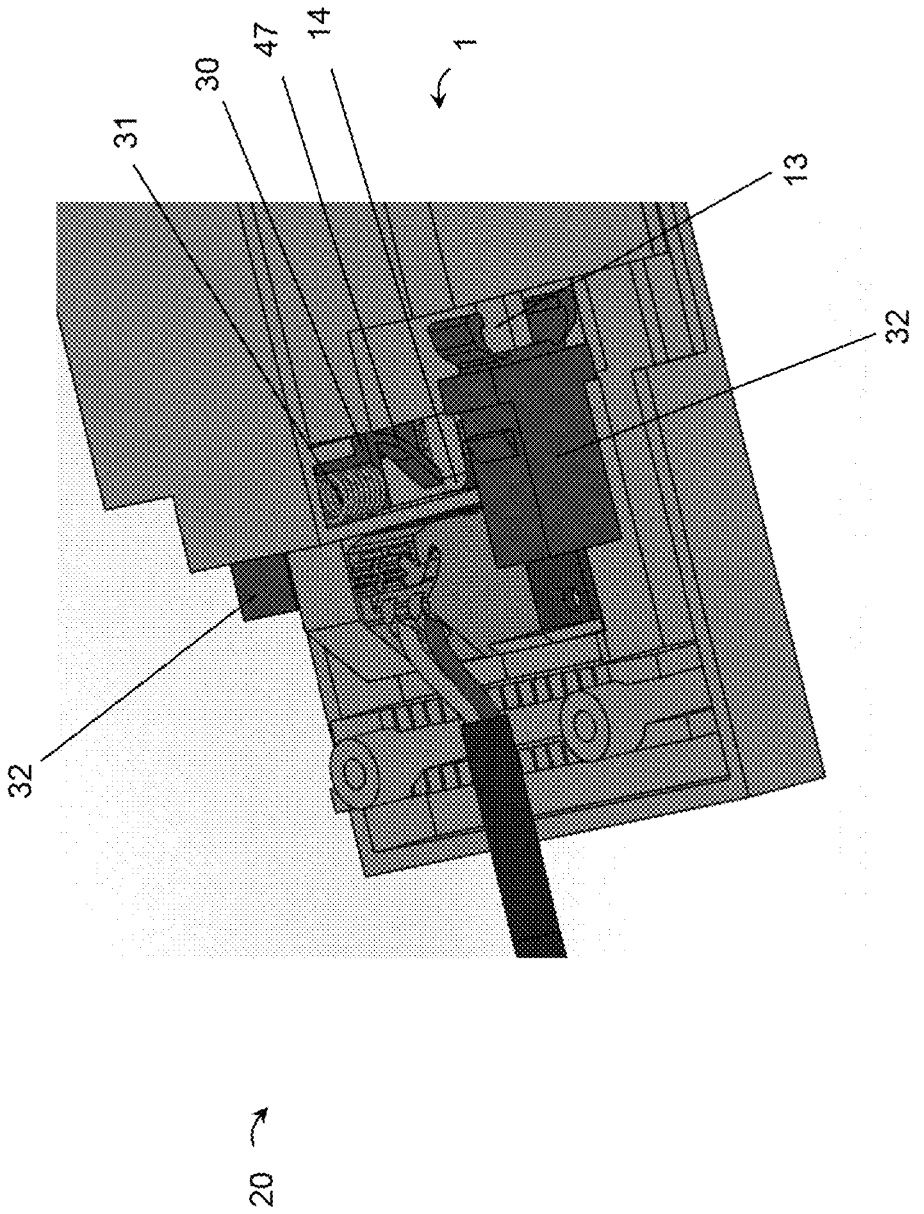
FIG. 17 shows a cutaway view of the coupling region of the driver and the driver bracket with door release snaps according to an embodiment.

FIG. 17 shows a cutaway view of the coupling region of the driver 1 and the driver bracket 20 with door release snaps according to an embodiment. The driver 1 and the driver bracket 20, shown in FIG. 17, are coupled with each other such that both the mechanical and electrical coupling between the driver 1 and the driver bracket 20 is established. The spring 31 is brought to a compressed state by the protective cover 30 which has been pushed to the "open" position by the pole 14 of the driver 1. The snapping pins 13 of the driver 1 are engaged in the door release snaps 32. The door release snaps 32 may have a locking mechanism for locking the snapping pins 13 engaged in the door release snaps 32 such that the driver 1 is automatically secured in the coupled position once the snapping pins 13 are pushed into the door release snaps 32. In some embodiments, the door locking mechanism of the door release snaps 32 is configured such that it is automatically activated by pushing the snapping pins 13 into the door release snaps 32 to lock the snapping pins 13 inside the door release snaps 32. The door release snaps 32 can be further configured such that the snapping pins 13 are automatically released and ejected from the door release snaps 32 when the snapping pins 13 are pushed again against the door release snaps 32. Thus, both the coupling and de-coupling of the driver 1 can be achieved with a simple translational movement of pushing the driver 1 and the driver bracket 20 against each other.

Figure 18:
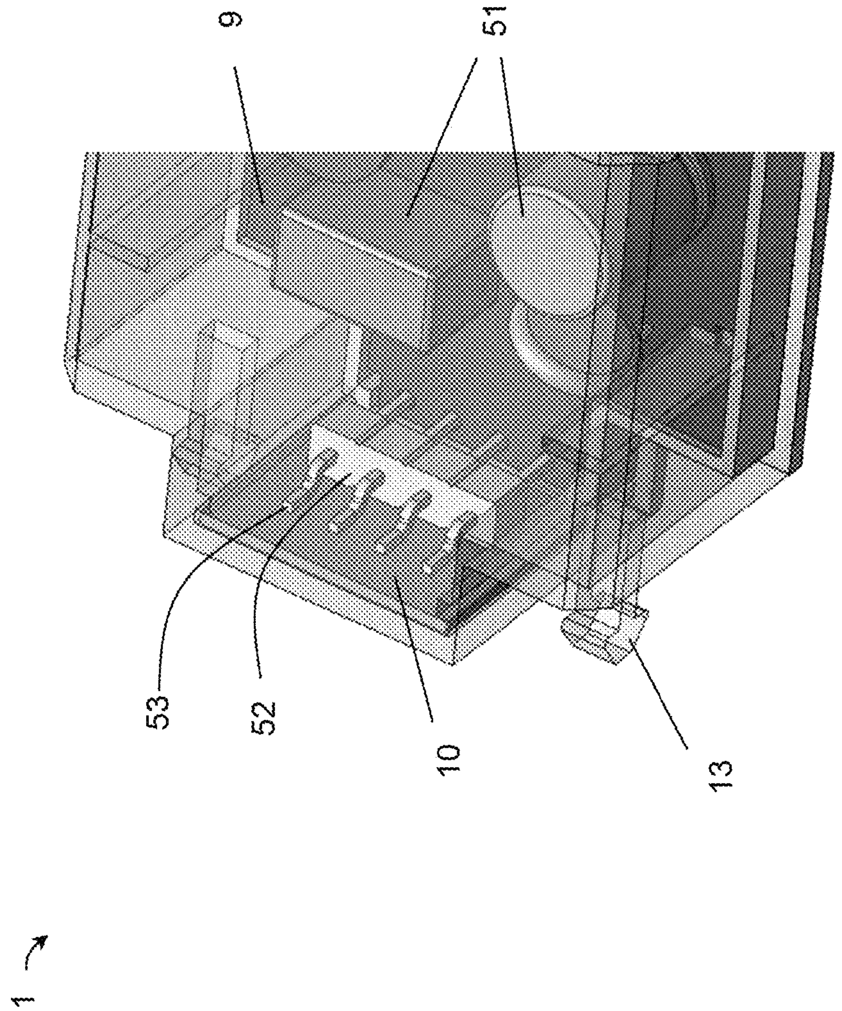
FIG. 18 shows a perspective view of a connection between a transfer PCB and a driver PCB according to an embodiment.

FIG. 18 shows a perspective view of a connection between a transfer PCB 10 and a driver PCB 9 according to an embodiment. In the cutaway view of the FIG. 18, some electronic components 51 of the driver assembly 8, mounted on the driver PCB 9, are shown. A connector 52 with contact pins 53 is mounted on the transfer PCB 10 such that an electrical connection between the contact pins 53 of the transfer PCB 10 and electrical contacts (not shown) of the driver PCB 9 can be established.

During the operation of the luminaire 34, the AC input current can be conducted from the mains over the AC cable 26 connected to the connector 40 and the wire connect PCB 42 over the plate contacts 43 of the driver bracket 20 to the plate spring contacts 45 mounted on the transfer PCB 10 of the driver 1. Over the connector 52, the AC current is conducted to the driver PCB 9 and can be converted into the DC output current by the driver circuit. The DC output current can flow from the driver circuit over the connector 52 and the transfer PCB 10 through the plate contacts 46 and the plate spring contacts 44 of the driver bracket 20 to the connect PCB 42 of the driver bracket 20. From the connect PCB 42, the DC current can be conducted through the DC output wires 29 to the light engine of the luminaire. Thus, both AC input current and the DC output current flow through the driver bracket 20 through the driver bracket interface 25 coupled with the driver interface 3. This makes the mounting or replacement of the driver 1 particularly easy and safe, since it does not require any special knowledge or tool.

While at least one exemplary embodiment has been presented in the foregoing detailed description, it should be appreciated that a vast number of variations exists. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments.

REFERENCE SYMBOLS AND NUMERALS

1 driver
2 housing
3 driver interface
4 mechanical interface
5 electrical interface
6 top housing
7 bottom cover
8 driver assembly
9 driver PCB
10 transfer PCB
11 AC input area
12 DC output area
13 snapping pin
14 pole
20 driver bracket
21 housing
22 top housing
23 bottom cover
24 top cover
25 driver bracket interface
26 AC cable
27 circuit assembly
28 wire connect PCB
29 DC output wire
30 protective cover
31 spring
32 door release snap
33 mounting surface
34 luminaire
35 screw hole
36 screw
37 snap
38 screw hole
39 snap hole

40 connector
41 cover
42 wire connect PCB
43 plate contact
44 plate spring contact
45 plate spring contact
46 plate contact
47 slant surface
48 guide
49 guiding slot
50 guiding rail
51 electronic component
52 connector
53 contact pin

What is claimed is:

1. A driver for driving a light engine of a luminaire, the driver comprising:

a driver assembly with a driver circuit configured for converting an input current provided by a power supply into an output current for driving the light engine;

a housing configured for receiving the driver assembly; and a driver interface being detachably engageable with a driver bracket, wherein the driver interface comprises:

a mechanical interface configured for mechanically coupling the driver to a mechanical interface of the driver bracket; and an electrical interface configured for electrically coupling the driver to an electrical interface of the driver bracket in such a way that the input current from the power supply to the driver circuit and the output current from the driver circuit to the light engine flow via the driver interface.

2. The driver according to claim 1, wherein the driver interface is configured such that:

coupling of the mechanical interface of the driver to the mechanical interface of the driver bracket automatically couples the electrical interface of the driver to the electrical interface of the driver bracket; and decoupling of the mechanical interface of the driver from the mechanical interface of the driver bracket automatically decouples the electrical interface of the driver from the electrical interface of the driver bracket.

3. The driver according to claim 1, wherein the mechanical interface of the driver is configured such that mechanical coupling is achieved by pressing the driver and the driver bracket against each other.

4. The driver according to claim 3, wherein the mechanical interface of the driver is further configured such that mechanical decoupling is achieved by pushing the driver and the driver bracket against each other.

5. The driver according to claim 1, wherein the electrical interface comprises:

an AC input area with at least one AC input contact; and a DC output area with at least one DC output contact.

6. The driver according to claim 5, wherein at least one of the AC input contact and the DC output contact comprises at least one spring plate contact.

7. The driver according to claim 1, wherein:

the driver bracket is configured as a socket; and the mechanical interface of the driver is configured as a plug which is insertable in a mechanical interface of the driver bracket.

8. The driver according to claim 7, wherein the electrical interface of the driver interface is formed at a front portion of the plug.

9. The driver according to claim 1, wherein the driver interface further comprises a pole for pushing away a protective cover of the driver bracket.

10. A driver bracket for coupling with the driver according to claim 1, the driver bracket comprising:

a circuit assembly comprising:

one or more input contacts electrically connectable to a power supply; and one or more output contacts electrically connectable to the light engine;

a housing configured for receiving the circuit assembly; and a driver bracket interface being detachably engageable with the driver interface, wherein the driver bracket interface is configured such that the input current from the power supply to the driver assembly and the output current from the driver assembly to the light engine flow via the driver bracket interface.

11. The driver bracket according to claim 10, wherein the driver bracket interface comprises a slidably mounted protective cover with a spring for keeping interface contacts covered when the driver bracket is not coupled with the driver.

12. The driver bracket according to claim 10, wherein the driver bracket interface comprises one or more door release snaps configured for receiving snapping pins of the driver interface.

13. The driver bracket according to claim 10, wherein the housing of the driver bracket comprises mounting elements for mounting the driver bracket on a luminaire.

14. A luminaire comprising:

a light engine; and the driver bracket according to claim 10.

15. A luminaire comprising:

a light engine; and a driver bracket for coupling with a driver for driving the light engine, the driver bracket comprising:

a circuit assembly comprising:

one or more input contacts electrically connectable to a power supply; and one or more output contacts electrically connectable to the light engine;

a housing configured for receiving the circuit assembly; and a driver bracket interface being detachably engageable with a driver interface of the driver, wherein the driver bracket interface is configured such that an input current from the power supply to a driver assembly of the driver and an output current from the driver assembly of the driver to the light engine flow via the driver bracket interface.

16. The luminaire according to claim 15, further comprising the driver for driving the light engine of the luminaire, the driver comprising:

the driver assembly with a driver circuit configured for converting the input current provided by the power supply into the output current for driving the light engine;

a housing configured for receiving the driver assembly; and a driver interface being detachably engageable with the driver bracket, wherein the driver interface comprises:

a mechanical interface configured for mechanically coupling the driver to a mechanical interface of the driver bracket; and an electrical interface configured for electrically coupling the driver to an electrical interface of the driver bracket in such a way that the input current from the power supply to the driver circuit and the output current from the driver circuit to the light engine flow via the driver interface;

wherein the driver is mechanically and electrically coupled to the driver bracket.

* * * * *